(12) United States Patent
Bellot et al.

(10) Patent No.: US 7,735,592 B2
(45) Date of Patent: Jun. 15, 2010

(54) REGULATED OUTPUT VOLTAGE GENERATOR-SET APPLIED TO MOBILE EQUIPMENT IN THE TURF INDUSTRY

(75) Inventors: Carlos A Bellot, Charlotte, NC (US); Martin M. Carlson, Tega Cay, SC (US); Kenneth R. Wilson, Stanley, NC (US)

(73) Assignee: Textron Innovations Inc., Providence, RI (US)

( * ) Notice: Subject to any disclaimer, the term of this patent is extended or adjusted under 35 U.S.C. 154(b) by 349 days.

(21) Appl. No.: 12/020,854

(22) Filed: Jan. 28, 2008

(65) Prior Publication Data

US 2009/0188227 A1    Jul. 30, 2009

(51) Int. Cl.
*B60K 6/00*    (2007.10)

(52) U.S. Cl. .................. 180/165; 180/65.28; 56/10.6; 56/10.2 R

(58) Field of Classification Search .............. 180/65.21, 180/65.28, 165, 900, 168; 56/10.6, 10.8, 56/10.2 H, 10.2 R, 11.1
See application file for complete search history.

(56) References Cited

U.S. PATENT DOCUMENTS

| | | | |
|---|---|---|---|
| 5,417,193 A | | 5/1995 | Fillman et al. |
| 5,497,604 A | * | 3/1996 | Lonn ..................... 56/10.2 H |
| 5,549,089 A | | 8/1996 | Snell et al. |
| 5,794,422 A | | 8/1998 | Reimers et al. |
| 5,934,051 A | | 8/1999 | Hahn |
| 6,082,084 A | | 7/2000 | Reimers et al. |
| 6,138,528 A | * | 10/2000 | Fukumoto et al. ............. 74/745 |
| 6,449,934 B1 | | 9/2002 | Reimers et al. |
| 6,571,542 B1 | | 6/2003 | Fillman et al. |
| 6,591,593 B1 | * | 7/2003 | Brandon et al. .............. 56/10.6 |
| 6,644,004 B2 | | 11/2003 | Reimers et al. |
| 6,729,114 B2 | | 5/2004 | Fillman et al. |
| 6,857,253 B2 | | 2/2005 | Reimers et al. |
| 6,892,517 B2 | * | 5/2005 | Adams et al. ............ 56/10.2 R |
| 6,938,400 B2 | | 9/2005 | Fillman et al. |
| 7,275,355 B2 | * | 10/2007 | Adams et al. ............ 56/10.2 H |
| 7,367,173 B2 | * | 5/2008 | Daly et al. ............... 56/10.2 R |
| 2005/0230168 A1 | | 10/2005 | Fillman et al. |

FOREIGN PATENT DOCUMENTS

EP    0959660 B1    6/2003

* cited by examiner

*Primary Examiner*—Hau V Phan
(74) *Attorney, Agent, or Firm*—Harness, Dickey & Pierce, P.L.C.

(57) ABSTRACT

A turf maintenance vehicle includes an internal combustion engine and an energy converting device that converts mechanical energy from the engine to electric energy. The vehicle also includes at least one subsystem powered by the electric energy from the energy converting device. The vehicle further includes a demand sensor that detects electrical demand from the subsystem. Also, the vehicle includes a controller that changes a speed range of the engine based on the electrical demand, which changes the operating voltage range output from the energy converting device. A method of operation of the vehicle is also disclosed.

21 Claims, 3 Drawing Sheets

REGULATED OUTPUT VOLTAGE GENERATOR-SET APPLIED TO MOBILE EQUIPMENT IN THE TURF INDUSTRY

FIELD

The present disclosure relates to mobile equipment in the turf industry and, more particularly, relates to a regulated output voltage generator-set applied to mobile equipment in the turf industry.

BACKGROUND

The statements in this section merely provide background information related to the present disclosure and may not constitute prior art.

Turf maintenance vehicles (i.e., grounds keeping vehicles) are used for used for various tasks, such as cutting grass, fertilizing soil, and the like. These vehicles can include one or more electrically-powered subsystems. For instance, some mowers include electrically-powered ground traction subsystems for propelling the mower, electrically-powered cutting implement subsystems for cutting grass, electrically-powered steering subsystems for steering the vehicle, and/or electrically-powered accessory subsystems for illuminating headlamps, gauges, and the like. Turf maintenance vehicles of this type are disclosed, for instance, in U.S. Pat. No. 6,571, 542, U.S. Pat. No. 6,938,400, U.S. Patent Publication No. 2005/0230168, U.S. Pat. No. 6,729,114, U.S. Pat. No. 6,857, 253, U.S. Pat. No. 6,644,004, U.S. Pat. No. 6,449,934, U.S. Pat. No. 6,082,084, and U.S. Pat. No. 5,794,422, each of which is incorporated by reference in its entirety.

These subsystems can be electrically powered by a variety of power sources. For instance, some turf maintenance vehicles include an internal combustion engine (ICE), such as a gas or diesel engine, which is operatively connected to an energy converting device (ECD), such as an alternator or a generator. The ICE creates mechanical energy from combustion of fuel, and the ECD converts the mechanical energy from the engine to electrical energy. The electrical energy from the ECD is used to power one or more of the sub-systems of the vehicle. Typically, these vehicles also include a voltage regulator that regulates voltage from the ECD to maintain proper operation of the subsystems.

However, the engine speed range remains constant (e.g., between 2700 RPM and 3100 RPM) regardless of the electrical demand of the subsystems. Thus, even when the electrical demand is low, the ICE may still operate at a relatively high speed. As such, the ICE burns fuel excessively and the ICE makes excessive noise. Also, even when electrical demand is high, the ICE may operate at too low a speed, and the electrical demand may not be adequately met by the ECD.

SUMMARY

A turf maintenance vehicle is disclosed that includes an internal combustion engine and an energy converting device operatively coupled to the internal combustion engine. The energy converting device converts mechanical energy from the internal combustion engine to electric energy. The turf maintenance vehicle also includes at least one subsystem powered by the electric energy from the energy converting device. The turf maintenance vehicle further includes a demand sensor that detects an electrical demand of the subsystem. The demand sensor outputs an electrical demand signal correlating to the electrical demand of the subsystem. The turf maintenance vehicle additionally includes a controller that receives the electrical demand signal and outputs a control signal that changes a speed range of the internal combustion engine based on the electric demand signal. The controller changes the speed range of the engine between a first speed range, which causes the energy converting device to produce electric energy within a first operating voltage range, and a second speed range, which causes the energy converting device to produce electric energy within a second operating voltage range.

A method of controlling a turf maintenance vehicle is also disclosed. The turf maintenance vehicle includes an internal combustion engine and an energy converting device operatively coupled to the internal combustion engine to convert mechanical energy from the internal combustion engine to electric energy. The method includes detecting an electrical demand of a subsystem of the turf maintenance vehicle. The method additionally includes changing a speed range of the internal combustion engine based on the electrical demand between a first speed range and a second speed range. The first speed range causes the energy converting device to produce electric energy within a first operating voltage range, and the second speed range causes the energy converting device to produce electric energy within a second operating voltage range.

In another aspect, a turf maintenance vehicle is disclosed, which includes an internal combustion engine and an actuator system operatively coupled to the internal combustion engine to change a speed range of the internal combustion engine. The vehicle also includes an energy converting device operatively coupled to the internal combustion engine to convert mechanical energy from the internal combustion engine to electric energy. The vehicle further includes a ground traction system powered by the electric energy from the energy converting device, a turf maintenance implement system powered by the electric energy from the energy converting device, a steering system powered by the electric energy from the energy converting device, an energy storage system, and an accessory system powered by the electric energy from the energy converting device. The vehicle also includes a demand sensor that detects an electrical demand of the ground traction system, the turf maintenance implement system, the steering system, the energy storage system, and the accessory system. The demand sensor outputs an electrical demand signal correlating to the electrical demand. The vehicle further includes a controller that receives the electrical demand signal and outputs a control signal to the actuator system to change the speed range of the internal combustion engine based on the electrical demand signal. The actuator system decreases the speed range from a first speed range to a second speed range when the electrical demand is below a predetermined level. The first speed range causes the energy converting device to produce electric energy within a first operating voltage range, and the second speed range causes the energy converting device to produce electric energy within a second operating voltage range. The actuator system also increases the speed range from the first speed range to a third speed range when the energy converting device recharges the energy storage system. The third speed range causes the energy converting device to produce electric energy within a third operating voltage range.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
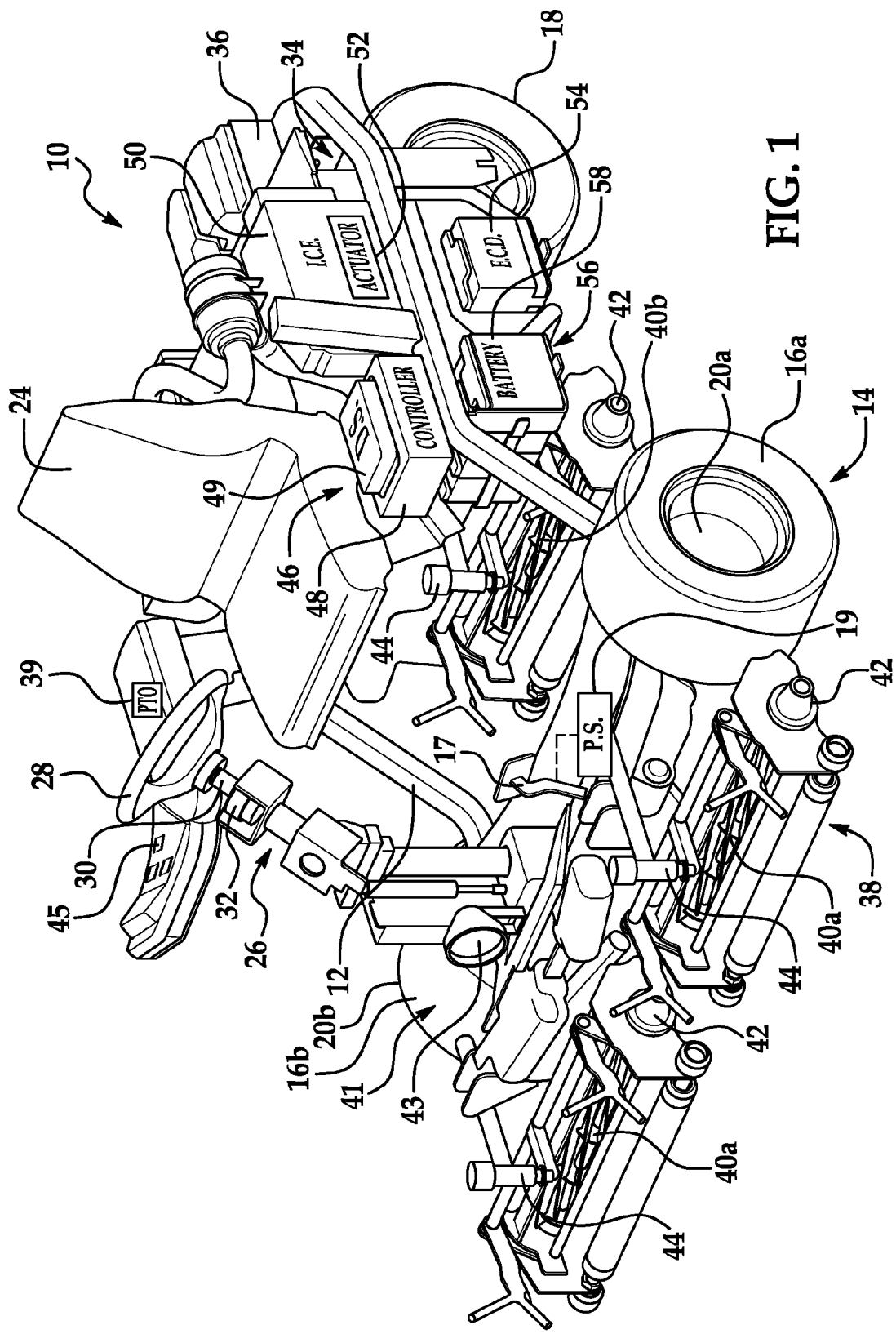
FIG. 1 is a schematic view of one embodiment of a turf maintenance vehicle according to the present disclosure.

The following description is merely exemplary in nature and is not intended to limit the present disclosure, application, or uses. It should be understood that throughout the drawings, corresponding reference numerals indicate like or corresponding parts and features.

Referring initially to FIG. 1, a turf maintenance vehicle 10 (i.e., a grounds keeping vehicle) is illustrated. In the embodiment shown, the turf maintenance vehicle 10 is a riding mower for cutting grass and other turf maintenance operations. However, it will be appreciated that the vehicle 10 could be of any suitable type, including a walk-behind mower or any other type of turf maintenance vehicle, without departing from the scope of the present disclosure.

The vehicle 10 generally includes a frame 12. The vehicle 10 also includes a ground traction system 14 that supports the frame 12 and propels the vehicle 10. In the embodiment shown, the ground traction system 14 includes a plurality of wheels 16a, 16b, 18, including a left front wheel 16a, a right front wheel 16b, and a rear wheel 18. It will be appreciated that the ground traction system 14 could include any suitable configuration including any suitable number of wheels. In the embodiment of FIG. 1, the front wheels 16a, 16b provide propulsion for the vehicle 10. More specifically, the ground traction system 14 includes a left front propulsion motor 20a and a right front propulsion motor 20b. The left front propulsion motor 20a is operatively connected to the left front wheel 16a, and the right front propulsion motor 20b is operatively connected to the right front wheel 16b. Also, in the embodiment shown, the propulsion motors 20a, 20b are electric motors powered by electricity as will be discussed in greater detail below. As such, when energy is delivered to the propulsion motors 20a, 20b, the propulsion motors 20a, 20b drivingly rotate the respective wheels 16a, 16b so as to propel the vehicle 10. In the embodiment shown, the propulsion motors 20a, 20b independently drivingly rotate the respective wheels 16a, 16b; however, the vehicle 10 could include an axle that rotatably couples the left front wheel 16a and the right front wheel 16b, and a single electric motor could drivingly rotate the axle to thereby propel the vehicle 10. The vehicle 10 could also include any suitable transmission for gear reduction purposes.

The ground traction system 14 further includes a speed control device 17 and a position sensor 19. The speed control device 17 can be of any suitable type, such as an accelerator pedal, a joystick, a lever, and the like. In some embodiments, the operator (not shown) can actuate the speed control device 17 by foot to thereby change the speed of the vehicle 10. For instance, pressing the speed control device 17 further forward increases the speed of the vehicle 10. It will be appreciated that the vehicle 10 could include any suitable accelerator input device other than a pedal, such as a hand-operated lever and the like. The position sensor 19 detects a position of the speed control device 17 in order to change the power delivery to the propulsion motors 20a, 20b as will be described. The position sensor 19 can be of any suitable type, such as a potentiometer, a Hall Effect sensor, and the like. The vehicle 10 further includes a brake system (not shown) for reducing the ground speed of the vehicle 10.

In addition, the vehicle 10 includes an operator seat 24. The operator seat 24 is mounted on the frame 12 and provides a place for the operator (not shown) to sit and operate the various subsystems of the vehicle 10.

The vehicle 10 further includes a steering system, generally indicated at 26. In the embodiment shown, the steering system 26 is a drive-by-wire system, and only the rear wheel 18 is steered. However, the vehicle 10 could include any suitable steering system, including a steering system with mechanical couplings between the steering implement and the steered wheel. Also, the vehicle 10 could include any number of steered wheels. In the embodiment shown, the steering system 26 includes a steering wheel 28 provided in front of the operator seat 24. The steering system 26 also includes a shaft 30 rotatably fixed to the steering wheel 28. The steering system 26 additionally includes a steering angle sensor 32 operatively coupled to the shaft 30 for detecting a steering angle (i.e., a turning angle) of the shaft 30 and the steering wheel 28. Moreover, the steering system 26 includes an actuator system 34 operatively coupled to the rear wheel 18 for changing the turning angle of the rear wheel 18. The actuator system 34 changes the turning angle of the rear wheel 18 based on the steering angle detected by the steering angle sensor 32. In one embodiment, the actuator system 34 includes a motor 36 that outputs mechanical energy to change the steering angle of the rear wheel 18. The actuator system 34 can also include any appropriate gearing, linkages, and the like for operatively coupling the motor 36 and the rear wheel 18. As such, the motor 36 of the actuator system 34 outputs energy to turn (i.e., steer) the rear wheel 18 depending on the steering angle detected by the steering angle sensor 32. In one embodiment, the motor 36 of the actuator system 34 is an electric motor powered by electricity. It will also be appreciated that the steering system could include a hydraulic system for steering purposes or any other suitable components without departing from the scope of the present disclosure.

The vehicle 10 additionally includes a turf maintenance implement system, generally indicated at 38. The turf maintenance implement system 38 is generally used for turf maintenance purposes, such as grass cutting, fertilizing, material reduction, and the like. In the embodiment shown, the turf maintenance implement system 38 includes a plurality of cutting implements, namely a plurality of front cutters 40a and a rear cutter 40b. In the embodiment shown, the cutters 40a, 40b are reel-type cutters; however, it will be appreciated that the cutters 40a, 40b could be of any suitable type without departing from the scope of the present disclosure. Also, the turf maintenance implement system 38 includes a plurality of cutter motors 42, each operatively coupled to a respective cutter 40a, 40b. In one embodiment, the cutter motors 42 are each electric motors that are powered by electricity. When electric energy is delivered to the cutter motors 42, the cutter motors 42 actuate the respective cutters 40a, 40b to drivingly rotate the respective cutter 40a, 40b.

Furthermore, the turf maintenance implement system 38 includes a plurality of lift motors 44. Each of the lift motors 44 is operatively coupled to a respective cutter 40a, 40b, to change a vertical position of the respective cutter 40a, 40b. In one embodiment, the lift motors 44 are electric motors powered by electricity. Thus, when electricity is delivered to the lift motors 44, the lift motors 44 actuate the respective cutter 40*a*, 40*b*, such that the cutters 40*a*, 40*b* can be lifted (e.g., for higher speed travel) or lowered (e.g., for cutting operations).

The turf maintenance implement system 38 further includes at least one power take-off switch 39 that selectively operates the cutter motors 42 and/or the lift motors 44 to thereby selectively operate the turf maintenance implement system 38. More specifically, the operator (not shown) can turn the cutter motors 42 on and off and/or can turn the lift motors 44 on and off using the power take-off switch 39. It will be appreciated that the vehicle 10 could include a plurality of power take-off switches 39. The power take-off switch 39 can be of any suitable known type.

The turf maintenance vehicle 10 additionally includes an accessory system 41. The accessory system 41 could include any number and any type of accessory that is indirectly related to turf maintenance purposes. In the embodiment shown, the accessory system 41 includes a head lamp 43. The head lamp 43 is fixed to the frame 12 at a forward position of the vehicle 10, and the head lamp 43 illuminates the forward path of the vehicle 10. In the embodiment shown, the head lamp 43 is an electric head lamp 43 and is powered by electricity. Also, the accessory system 41 includes a switch 45. In one embodiment, the switch 45 is an on/off switch; however, it will be appreciated that the switch 45 could be of any suitable type. The switch 45 can be manipulated by the operator in order to selectively turn the head lamp 43 on and off. The accessory system 41 can also include one or more gauges, lights, and the like for displaying the status of the vehicle 10 to the operator.

Moreover, the vehicle 10 includes a control system, generally indicated at 46. The control system 46 includes a controller 48, which includes circuitry and programmed logic. In one embodiment, the controller 48 is the main controller for governing all operations of the vehicle 10. The control system 46 further includes a demand sensor 49, which detects the electrical demand of the traction system 14, the turf maintenance implement system 38, the steering system 26, and the accessory system 41.

Figure 2:
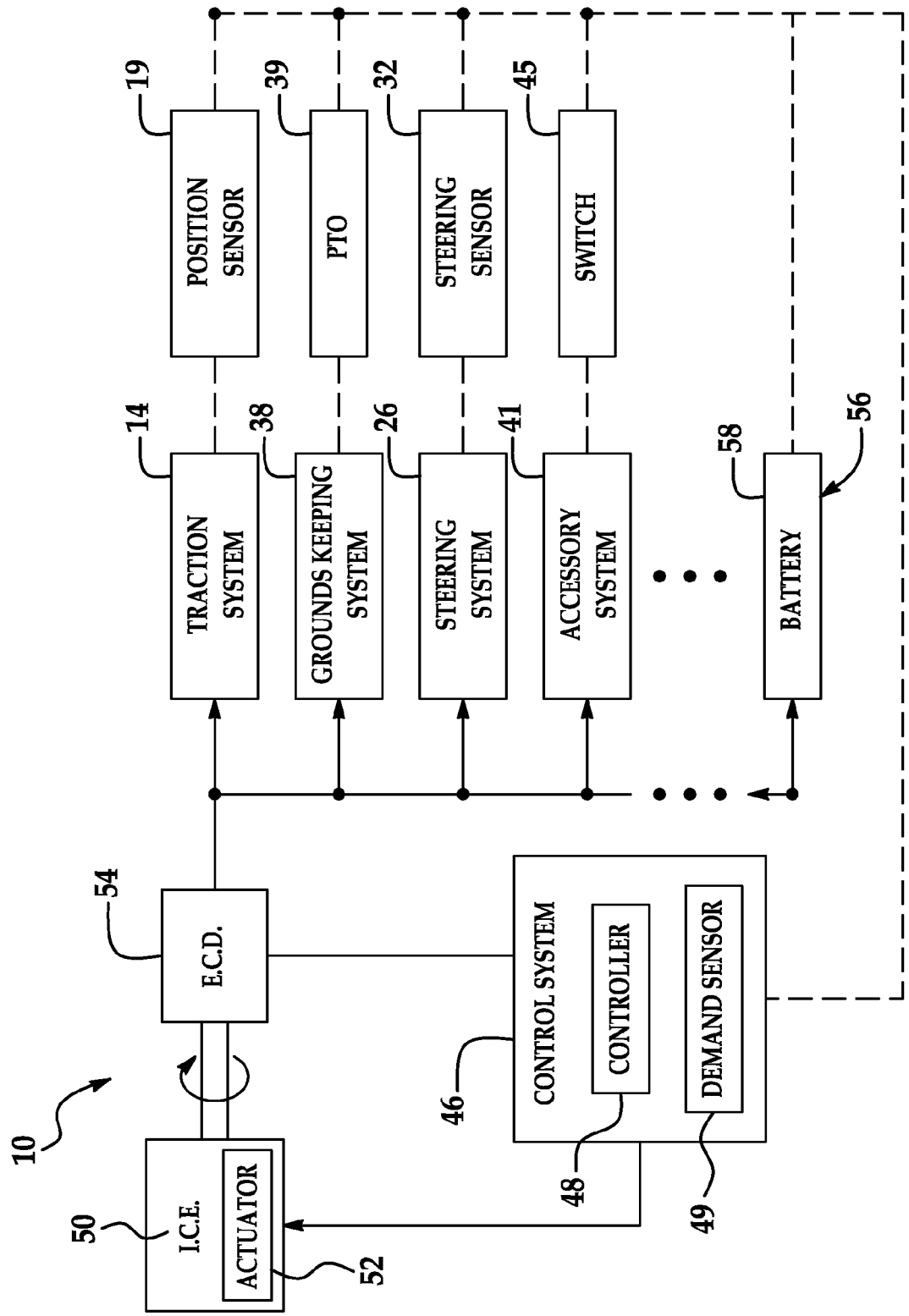
FIG. 2 is a schematic view of the turf maintenance vehicle of FIG. 1.

As shown in FIG. 2, the control system 46 is in communication with the position sensor 19, the power take-off switch 39, the steering sensor 32, and the switch 45. As such, the demand sensor 49 of the control system 46 is able to detect an electrical demand of the traction system 14, the turf maintenance implement system 38, the steering system 26, and the accessory system 41, respectively, as will be described in greater detail below. More specifically, during operation, the position sensor 19, the power take-off switch 39, the steering sensor 32, and/or the switch 45 transmit signals to the demand sensor 49 of the control system 46, which correlate to electrical needs of these systems 14, 38, 26, 41. As will be described below, the controller 48 causes power delivery to the traction system 14, the turf maintenance implement system 38, the steering system 26, and/or the accessory system 41 to thereby meet the detected electrical demand. In one embodiment, the controller 48 relies on a signal feedback system for proper energy delivery to the systems 14, 38, 26, 41 of the vehicle. It will be appreciated that the demand sensor 49 could be configured to detect electrical demand of other systems of the vehicle 10 that are not illustrated without departing from the scope of the present disclosure.

The vehicle 10 further includes an internal combustion engine 50. The internal combustion engine 50 can be of any suitable known type, such as a gasoline or diesel engine.

Moreover, the vehicle 10 includes an actuator system 52, which is operatively coupled to the internal combustion engine 50. The actuator system 52 could be of any suitable known type for selectively changing the speed range of the engine 50, such as a throttle system and/or a speed governor system. For instance, the actuator system 52 can include an electromechanical actuator that is electrically driven by the controller 48. In the case of a gasoline engine 50, the actuator system 52 includes a butterfly valve or plate (not shown) on the carburetor of the engine 50. As such, the actuator system 52 controls the amount by which the butterfly moves to expose the ports in the throat of the carburetor. However, it will be understood that a different actuator system 52 can be used, for example, a mechanical linkage, together with a mechanical governor control arrangement in the case of a diesel engine. It will also be appreciated that the actuator system 52 could change the speed range of the engine 50 by selectively changing only the top speed or lowest speed (i.e., idle speed). Moreover, in some embodiments, the actuator system 52 changes the speed range of the engine 50 by changing air flow rate to the engine 50, fuel flow to the engine 50, and/or spark timing of the engine 50. Furthermore, it will be appreciated that the speed range of the engine 50 could be selectively changed without an actuator system 52, such as with an electrically-based (e.g., logic-based) system, for instance, for changing the spark timing of the engine 50.

The vehicle 10 additionally includes an energy converting device 54. The energy converting device 54 is operatively coupled to the internal combustion engine 50 to convert mechanical energy from the internal combustion engine 50 to electric energy. More specifically, the internal combustion engine 50 includes an output shaft that is rotated due to combustion of fuel, and this mechanical energy is converted by the energy converting device 54 into electricity in a known manner. The energy converting device 54 outputs current between 0-180 amps according to the electrical demand, in one embodiment. The energy converting device 54 can be of any suitable type, including any known type of generator or alternator. As shown in FIG. 2, the energy converting device 54 is in electrical communication with the traction system 14, the turf maintenance implement system 38, the steering system 26, and the accessory system 41. Thus, the systems 14, 38, 26, 41 are each powered by electric energy from the energy converting device 54. Although each of the systems 14, 38, 26, 41 is electrically powered in the embodiment shown, it will be appreciated that less than all of the systems 14, 38, 26, 41 of the vehicle 10 can be electrically powered. It will also be appreciated that other systems of the vehicle 10 that are not illustrated can be powered by the energy converting device 54 without departing from the scope of the present disclosure.

The energy converting device 54 outputs an amount of electricity based on the speed of the internal combustion engine 50. Specifically, as the speed of the internal combustion engine 50 increases, the energy converting device 54 outputs a higher voltage, and as the internal combustion engine 50 reduces in speed, the energy converting device 54 outputs a lower voltage.

As will be described in greater detail, the control system 46 changes the speed of the internal combustion engine 50 based on the electrical demand of the traction system 14, turf maintenance implement system 38, steering system 26, accessory system 41, and/or the energy storage system 56, such that the electrical demand of the systems of vehicle 10 can be adequately met. More specifically, the demand sensor 49 detects the electrical demand of the traction system 14 via the position of the speed control device 17 detected by the position sensor 19, the electrical demand of the turf maintenance implement system 38 via the configuration of the power take-off switch 39, the electrical demand of the steering system 26 via steering signals from the steering sensor 32, and the electrical demand of the accessory system 41 via the configuration of the switch 45. The demand sensor 49 outputs an electrical demand signal correlating to the detected electrical demand from each of the systems 14, 38, 26, 41. The controller 48 receives the electrical demand signal and outputs a control signal, which causes the actuator system 52 to actuate to change the speed range of the internal combustion engine 50 based on the detected electrical demand. As a result, the operating voltage range of the energy converting device 54 changes to meet the detected electrical demand.

Furthermore, the vehicle 10 includes an energy storage device, generally indicated at 56. In the embodiment shown, the energy storage device 56 includes at least one battery 58. In one embodiment, the vehicle 10 includes a plurality of batteries 58. In other embodiments, the energy storage device 56 includes a plurality of capacitors. In the embodiments shown, the battery 58 stores energy, and selectively outputs electricity to the traction system 14, the turf maintenance implement system 38, the steering system 26 and/or the accessory system 41 to supplement electricity output from the energy converting device 54 as will be described. Also, the battery 58 can be recharged by the energy converting device 54. In other words, electricity from the energy converting device 54 can flow to the battery 58 to thereby recharge the battery 58. In one embodiment, the battery 58 is automatically recharged by the energy converting device 54 when the battery 58 outputs supplemental energy to the systems 14, 38, 26, 41.

As shown in FIG. 2, the demand sensor 49 is also in communication with the energy storage system 56. The demand sensor 49 detects when the battery 58 is being recharged by the energy converting device 54 to thereby detect an increased energy demand from the battery 58 as will be explained in greater detail below.

In one embodiment, when electrical demand from the traction system 14, turf maintenance implement system 38, steering system 26, accessory system 41, and/or energy storage system 56 is low (e.g., when the vehicle 10 is at rest, the turf maintenance implement system 38 is off, etc.), the controller 48 causes the speed of the internal combustion engine 50 to reduce from a first speed range to a second speed range. In one embodiment, the first speed range (i.e., normal operating speed range) is between approximately 2700 rpm and 3200 rpm, and the second speed range (i.e., reduced operating speed range) is between approximately 1200 rpm and 2200 rpm. More specifically, for a diesel engine, in various embodiments the second speed range is between approximately 1200 rpm and 1500 rpm, and for a gas engine, the second speed range has an average of approximately 2200 rpm with minimal fluctuation. Also, in one embodiment, the idle speed of the engine 50 is reduced when the detected electrical demand is low. As a result, the operating voltage output from the energy converting device 54 is reduced from a first operating voltage range to a second operating voltage range. In one embodiment, the first operating voltage range (i.e., normal operating voltage range) of the energy converting device 54 is between approximately 48 volts and 52 volts, and the second operating voltage range (i.e., reduced operating voltage rage) has an average of approximately 48 volts with minimal fluctuation.

Furthermore, if the demand sensor 49 detects a high electrical demand (e.g., when the vehicle 10 is traveling uphill, increased acceleration is detected from the position sensor 19 of the traction system 14, the power take-off switch 39 is on such that the cutters 40a, 40b are operating, the power take-off switch 39 is set such that the lift motors 44 are operating, the steering sensor 32 indicates steering changes by the operator of the steering system 26, and/or the switch 45 is set such that the head lamp 43 is on), then the controller 48 causes the internal combustion engine 50 to increase from a first speed range to a third speed range. In one embodiment, the first speed range (i.e., normal operating speed range) is between approximately 2700 rpm and 3200 rpm, and the third speed range (i.e., increased speed range) is between approximately 2700 rpm and 3600 rpm. This causes the energy output from the energy converting device 54 to increase from a first operating voltage range to a third operating voltage range. In one embodiment, the first operating voltage range is between approximately 48 and 52 volts, and the third operating voltage range is between approximately 55 and 60 volts.

Also, when electrical demand is high, the upper voltage limit of the third operating voltage range is limited by increasing the power output from the energy converting device 54. For instance, in one embodiment, the upper voltage limit from the energy converting device 54 is limited to a maximum of 60 volts by increasing the amperage to approximately 180 amps.

Also, in the embodiment shown, the battery 58 selectively outputs electricity to supplement the electric energy from the energy converting device 54 when the demand sensor 49 detects a high energy demand from the systems 14, 38, 26, 41. In one embodiment, the energy converting device 54 is able to output approximately 5.5 kW, and the battery 58 outputs supplemental electricity when the electrical demand from the systems 14, 38, 26, 41 exceeds the capacity of the energy converting device 54. More specifically, the controller 48 outputs a control signal to the energy storage system to selectively cause the battery 58 to output supplemental electricity.

When the battery 58 begins outputting supplemental electricity, the control system 46 causes the energy converting device 54 to output energy to the battery 58 to recharge the battery 58. In one embodiment, the energy converting device 54 immediately beings recharging the battery 58 once the battery 58 begins outputting supplemental electricity. In another embodiment, the energy storage system 56 includes a charge sensor (not shown), and the energy converting device 54 begins outputting energy to recharge the battery 58 when the charge sensor detects that the charge of the battery 58 falls below a predetermined level.

Also, as mentioned above, when the electrical demand is high, then the controller 48 causes the internal combustion engine 50 to increase from the first speed range to the third speed range. Thus, in the embodiment shown, when the battery 58 is being recharged, the controller 48 increases the speed range of the engine 50 from the first speed range to the third speed range. As such, the energy converting device 54 meets the electrical demand of the systems 14, 38, 26, 41 as well as the recharging needs of the battery 58.

Figure 3:
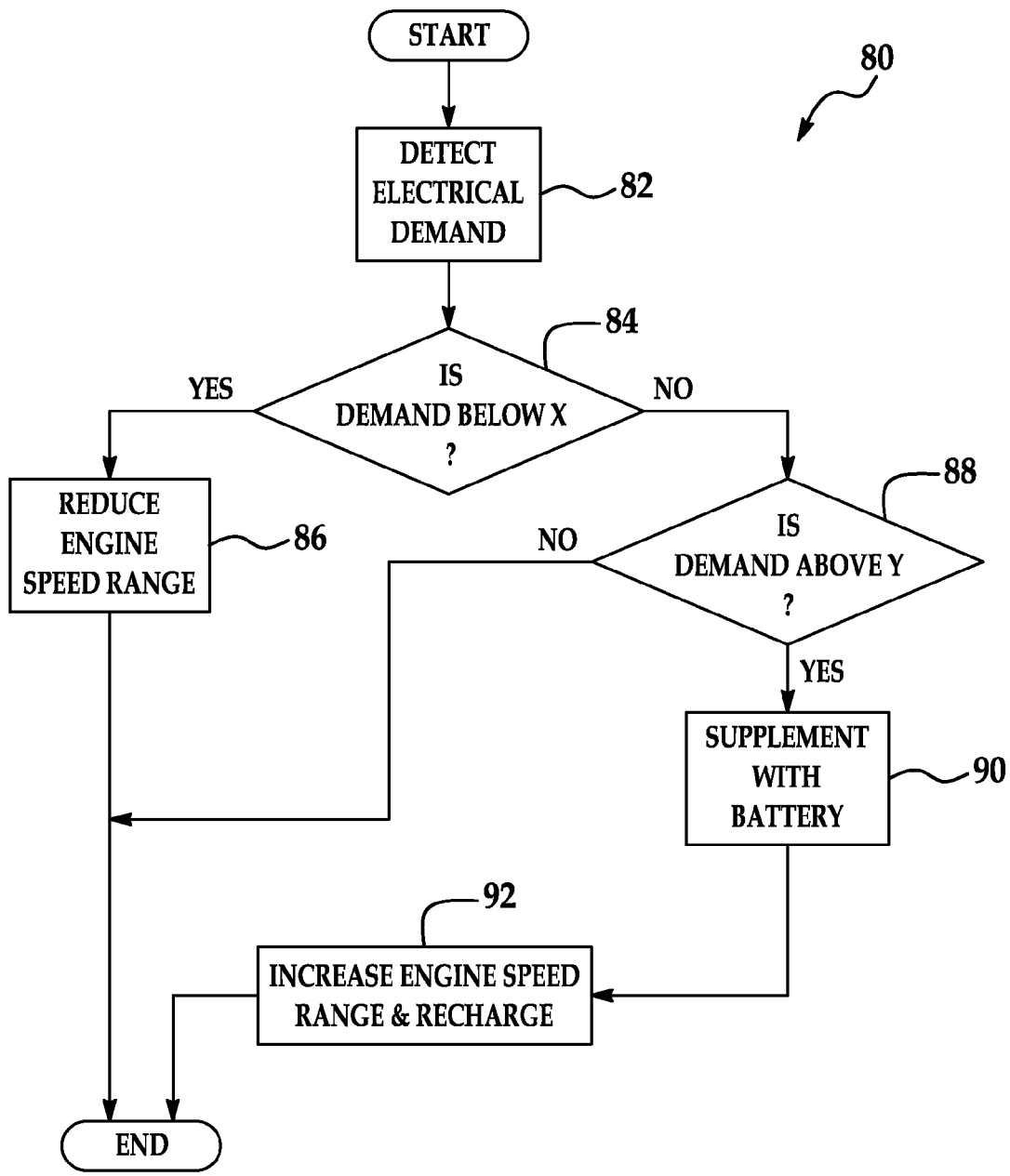
FIG. 3 is a flowchart illustrating a process of controlling the turf maintenance vehicle of FIG. 1.

Referring now to FIG. 3, one method 80 of controlling the vehicle 10 is illustrated. The method 80 begins at 82, in which the demand sensor 49 detects the electrical demand of the traction system 14, the turf maintenance implement system 38, the steering system 26, the accessory system 41 and/or the energy storage system 56.

Then, in decision block 84, it is determined whether the detected demand is below a predetermined level X. If the detected demand is below the predetermined level X, the method 80 continues at 86, in which the speed range of the internal combustion engine 50 is reduced as described above. However, if the electrical demand is not below the predetermined level X, the method 80 moves to decision block 88, in which it is determined whether the electrical demand is above the predetermined level Y.

If the detected demand is not above the predetermined level Y, the method 80 ends; however, if the detected demand is above the predetermined level Y, the method 80 moves to 90. At 90, the controller 48 causes the battery 58 to output supplemental electricity to the systems 14, 38, 26, 41 of the vehicle 10. Then, at 92, the controller 48 increases the speed range of the internal combustion engine 50 to increase and causes the energy converting device 54 to output energy to the battery 58 to thereby recharge the battery 58 in addition to outputting energy to the systems 14, 38, 26, 41 of the vehicle 10.

Accordingly, the performance and efficiency of the vehicle 10 can be improved using the method 80 and the control system 46 described above. For instance, when electrical demand is low, the engine speed can be reduced to thereby reduce fuel consumption and reduce operating noise while still meeting the electrical demand of the vehicle 10. Also, when higher electrical demand is detected, the speed of the internal combustion engine 50 can be increased selectively to meet the increased electrical demand of the vehicle 10. Response time for this system can be relatively low as well (e.g., approximately 0.25 seconds) for improved performance of the vehicle 10.

It will be appreciated that although the control system 46 changed the speed range of the engine 50 between three ranges, the control system 46 could change the speed range of the engine 50 between any number of ranges. It will also be appreciated that the control system 46 could change the operating voltage output from the energy converting device 54 between any number of ranges. Furthermore, it will be appreciated that the speed ranges of the engine 50 and the operating voltages output by the energy converting device 54 could have any suitable numerical range.

Moreover, it will be appreciated that the demand sensor 49 can detect electrical demand from the systems 14, 38, 26, 41, 58 in any suitable fashion. For instance, instead of detecting energy demand from the steering system 26 via the steering sensor 32, the demand sensor 49 could detect energy demand via the steering motor 36.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A turf maintenance vehicle comprising:
an internal combustion engine;
an energy converting device operatively coupled to the internal combustion engine to convert mechanical energy from the internal combustion engine to electric energy;
at least one subsystem powered by the electric energy from the energy converting device;
a demand sensor that detects an electrical demand of the at least one subsystem, the demand sensor outputting an electrical demand signal correlating to the electrical demand of the at least one subsystem; and
a controller that receives the electrical demand signal and outputs a control signal that changes a speed range of the internal combustion engine based on the electrical demand signal between a first speed range, which causes the energy converting device to produce electric energy within a first operating voltage range, and a second speed range, which causes the energy converting device to produce electric energy within a second operating voltage range.

2. The turf maintenance vehicle of claim 1, wherein the control signal reduces the speed range of the internal combustion engine from the first speed range to the second speed range when the electrical demand is below a predetermined level.

3. The turf maintenance vehicle of claim 2, wherein the first speed range is between approximately 2700 RPM and 3200 RPM and the second speed range is between approximately 1200 RPM and 2200 RPM.

4. The turf maintenance vehicle of claim 1, wherein the at least one subsystem is an energy storage system, wherein the control signal increases the speed range of the internal combustion engine from the first speed range to the second speed range when the energy converting device recharges the energy storage system.

5. The turf maintenance vehicle of claim 4, wherein the first speed range is between approximately 2700 RPM and 3200 RPM and the second speed range is between approximately 2700 RPM and 3600 RPM.

6. The turf maintenance vehicle of claim 1, wherein the at least one subsystem is at least one of a ground traction system, a turf maintenance implement system, a steering system, an energy storage system, or an accessory system, and wherein the demand sensor detects an electrical demand of the at least one of the ground traction system, the turf maintenance implement system, the steering system, the energy storage system, or the accessory system.

7. The turf maintenance vehicle of claim 6, further comprising a speed control device and a position sensor that detects a position of the speed control device, and wherein the demand sensor is in communication with the position sensor to detect the electrical demand of the ground traction system.

8. The turf maintenance vehicle of claim 7, wherein the speed control device is an accelerator pedal.

9. The turf maintenance vehicle of claim 6, further comprising a power take off switch that selectively operates the turf maintenance implement system, and wherein the demand sensor is in communication with the power take off switch to detect the electrical demand of the turf maintenance implement system.

10. The turf maintenance vehicle of claim 6, wherein the energy storage system includes at least one of a battery or a capacitor that supplements the electric energy from the energy converting device when the electric demand exceeds a predetermined level.

11. The turf maintenance vehicle of claim 1, further comprising an actuator system that is operatively coupled to the internal combustion engine and that receives the control signal from the controller, the control signal causing the actuator system to actuate to change the speed range of the internal combustion engine based on the electrical demand signal.

12. The turf maintenance vehicle of claim 11, wherein the actuator system is at least one of a throttle system or a speed governor system.

13. The turf maintenance vehicle of claim 12, wherein the actuator system actuates to change the speed range of the internal combustion engine by at least one of changing air flow rate to the internal combustion engine, changing fuel flow to the internal combustion engine, or changing spark timing of the internal combustion engine.

14. A method of controlling a turf maintenance vehicle having an internal combustion engine and an energy converting device operatively coupled to the internal combustion engine to convert mechanical energy from the internal combustion engine to electric energy, the method comprising:

detecting an electrical demand of at least one subsystem of the turf maintenance vehicle;

changing a speed range of the internal combustion engine based on the electrical demand between a first speed range, which causes the energy converting device to produce electric energy within a first operating voltage range, and a second speed range, which causes the energy converting device to produce electric energy within a second operating voltage range.

15. The method of claim 14, wherein changing the speed range comprises decreasing the speed range of the internal combustion engine from the first speed range to the second speed range when the electrical demand is below a predetermined level.

16. The method of claim 14, wherein detecting the electrical demand comprises detecting a recharge of an energy storage system, and wherein changing the speed range comprises increasing the speed range of the internal combustion engine from the first speed range to the second speed range when the recharge is detected.

17. The method of claim 14, wherein detecting the electrical demand comprises detecting the electrical demand from at least one of a ground traction system, a turf maintenance implement system, a steering system, an energy storage system, or an accessory system.

18. The method of claim 17, wherein detecting the electrical demand comprises at least one of detecting a position of a speed control device operatively coupled to the ground traction system or determining a switch configuration of a power take off switch operatively coupled to the turf maintenance implement system.

19. The method of claim 14, wherein changing the speed range comprises actuating at least one of a throttle system operatively coupled to the internal combustion engine or a speed governor system operatively coupled to the internal combustion engine.

20. The method of claim 14, wherein changing the speed range comprises at least one of changing air flow rate to the internal combustion engine, changing fuel flow to the internal combustion engine, or changing spark timing of the internal combustion engine.

21. A turf maintenance vehicle comprising:

an internal combustion engine;

an actuator system operatively coupled to the internal combustion engine to change a speed range of the internal combustion engine;

an energy converting device operatively coupled to the internal combustion engine to convert mechanical energy from the internal combustion engine to electric energy;

a ground traction system powered by the electric energy from the energy converting device;

a turf maintenance implement system powered by the electric energy from the energy converting device;

a steering system powered by the electric energy from the energy converting device;

an energy storage system;

an accessory system powered by the electric energy from the energy converting device;

a demand sensor that detects an electrical demand of the ground traction system, the turf maintenance implement system, the steering system, the energy storage system, and the accessory system, the demand sensor outputting an electrical demand signal correlating to the electrical demand;

a controller that receives the electrical demand signal and outputs a control signal to the actuator system to change the speed range of the internal combustion engine based on the electrical demand signal;

the actuator system decreasing the speed range from a first speed range, which causes the energy converting device to produce electric energy within a first operating voltage range, to a second speed range, which causes the energy converting device to produce electric energy within a second operating voltage range, when the electrical demand is below a predetermined level; and the actuator system also increasing the speed range from the first speed range to a third speed range, which causes the energy converting device to produce electric energy within a third operating voltage range, when the energy converting device recharges the energy storage system.

* * * * *